United States Patent [19]

Brodbeck

[11] E Re. 29,459

[45] Reissued Oct. 25, 1977

[54] EQUILIBRATION OF LOWER ALKYL SUBSTITUTED POLYALKYL AROMATIC HYDROCARBONS WITH REDUCED DISPROPORTIONATION

[75] Inventor: John J. Brodbeck, El Cerrito, Calif.

[73] Assignee: Chevron Research Company, San Francisco, Calif.

[21] Appl. No.: 529,304

[22] Filed: Dec. 5, 1974

Related U.S. Patent Documents

Reissue of:

[64] Patent No.: 3,647,898
Issued: Mar. 7, 1972
Appl. No.: 2,948
Filed: Jan. 14, 1970

[51] Int. Cl.[2] ..... C07C 15/08

[52] U.S. Cl. ..... 260/668 A; 260/672 T

[58] Field of Search ..... 260/668 A

[56] References Cited

U.S. PATENT DOCUMENTS

| | | | |
|---|---|---|---|
| 3,211,798 | 10/1965 | Burk et al. | 260/668 A |
| 3,214,485 | 10/1965 | Burk et al. | 260/668 A |
| 3,293,314 | 12/1966 | Brodbeck | 260/668 A |
| 3,793,384 | 2/1974 | Chenoweth et al. | 260/668 A |

*Primary Examiner*—Veronica O'Keefe

*Attorney, Agent, or Firm*—D. A. Newell; John Stoner, Jr.; W. Keith Turner

[57] ABSTRACT

Disproportionation losses in the isomerization of $C_8$ aromatic hydrocarbons are reduced by the use of silica-alumina catalyst composites with high surface areas and having *most of its pore volume from pores of* [pore] radii [in the main] above about 45° A.

9 Claims, No Drawings

EQUILIBRATION OF LOWER ALKYL SUBSTITUTED POLYALKYL AROMATIC HYDROCARBONS WITH REDUCED DISPROPORTIONATION

Matter enclosed in heavy brackets [ ] appears in the original patent but forms no part of this reissue specification; matter printed in italics indicates the additions made by reissue.

FIELD OF INVENTION

This invention relates to a method for the improvement of the catalyzed isomerization of lower alkyl polyalkyl-substituted aromatic hydrocarbons, particularly to the equilibration of non-equilibrium xylene feeds effected by silica-alumina composites. More particularly, it relates to novel catalyst parameters which result in a substantial reduction in the loss to disproportionation by-products normally experienced in the subject isomerization process.

BACKGROUND OF INVENTION

It is known to isomerize lower alkyl-substituted aromatic hydrocarbons at elevated temperatures by passing the vaporized feed into contact with a solid silica-alumina catalyst composite for the purpose of altering the isomer distribution of the hydrocarbon feed. The usual objective is to convert the feed into a mixture of isomeric compounds which more nearly approximates the known isomer equilibration composition for the specific feed composite or mixture. In practice, the foregoing equilibration process is coupled with a subsequent separation process utilizing physical or chemical means for the preferential and selective removal of a desired isomer from the equilibrate. By recycle of the residue from the separation stage and repetition of the overall operation one is able to convert a single isomeride or isomeric mixture to a desired specie of the equilibration set.

An undesirable aspect in conventional practice in the foregoing staged conversion and recovery cycle is that a substantial fraction of the process feed is lost because of a concurrent disproportionation reaction. For example, in a process for the production of p-xylene in which a p-xylene-reduced xylene mixture is isomerized in an extinction recycle process, the formation of disproportionation products such as benzene, toluene, and trimethyl benzenes represents an appreciable loss of xylene product or a large process burden where these components of the product stream are recycled to the process together with fresh feed. In a typical petroleum refinery operation it is usually preferred not to recycle such by-products. Consequently, as much as 30–40% of the xylene feed is converted through the disproportionation reaction to less desirable product.

*SUMMARY OF THE INVENTION*

It has now been found that in the isomerization of lower alkyl polyalkyl-substituted aromatic hydrocarbons relative rate differences between the concurrent isomerization and disproportionation reactions of these feeds can be effectively utilized by the employment of a silica-alumina catalyst composite having a surface area in the range 250–400 square meters per gram—preferably 270–350 square meters per gram—and wherein at least 40% of the [pores] *pore volume* of the catalyst [have] *is from pores having* a radius greater than 45 A., preferably greater than 50 A., and less than about 100 A. Surprisingly, the use of the isomerization catalysts herein results in a large reduction in the disproportionation loss experienced with conventional silica-alumina isomerization catalysts. As much as 40 percent and more of the former loss to disproportionation products is eliminated by employing the high surface area-high pore radius silica-alumina catalysts of the present invention.

By lower alkyl aromatic hydrocarbon isomerization conditions is meant a temperature in the range 700° F. to 1000° F., preferably from about 750° F. to 900° F., and at a liquid hourly space velocity in the range 0.1 to 10, and at a pressure below about 200 p.s.i.g., preferably below about 50 p.s.i.g.

Aromatic hydrocarbons having an aromatic carbocyclic carbon atom content (ring carbon atoms) in the range below about 13 and which have from 2 to about 4, preferably 2 to 3, lower alkyl groups are satisfactory feeds for the process herein.

By a lower alkyl group is meant an alkyl group having a carbon atom content of less than 4.

In general, isomerization catalysts comprising silica-alumina which have a surface area in the range 250–400 square meters per gram and for which at least 40 percent of the [pores have] *pore volume is from pores having* a radius greater than 45 A., are satisfactory for use in the instant process.

In a preferred embodiment of the invention the mother liquor remaining after removal by crystallization of p-xylene from an isomeric xylene mixture, i.e., a p-xylene reduced xylene feed, is used as a feed source for a catalyzed xylene isomerization stage in which the catalyst is a silica-alumina composite containing about 80 percent of silica, about 20 percent of alumina, the foregoing percentages being by weight, a surface area of 270–350 square meters per gram, with at least about 70 percent of the [pores having] *pore volume is from* a radius greater than 45 A., and with the particle sizing being in the range 0.06–0.1 inch. The isomerization is carried out in a fixed bed reactor system under the following conditions:

| | |
|---|---|
| Temperature, ° F. | 750–900 |
| Pressure, atmosphere | 1.1 |
| Co-feed water-ammonia: | |
| Water, p.p.m. of xylene | $5 \times 10^4$ |
| Ammonia, p.p.m. of xylene | 100 |

The effluent from the above isomerization stage is cooled as required and passed to a stripper column where water and the light aromatics produced in the isomerization are taken as an overhead fraction and the bottoms portion is passed to a second distillation column from which the xylene fraction is recovered as an overhead stream while the heavy aromatic, trimethyl benzenes and the like, produced in the isomerization are withdrawn from the process or a fraction thereof is recycled to the isomerization stage.

The silica-alumina catalysts useful herein are rigid three dimensional networks characterized by uniform pores having relatively large pore diameters. It appears that the combination of physical characteristics, the particular surface area range and uniformly high pore radius, of the catalyst permits a diffusivity relationship favoring the desired isomerization reaction relative to the unwanted disproportionation reaction within the liquid hourly space velocity range specified above.

Preferred catalyst composites contain silica and alumina in the weight ratio 70–90 and 10–30 respectively, preferably about 80 to 20.

In addition, useful composites may contain minor amounts, about 5 to 15 parts, of such metal oxides as magnesia, zirconia, thoria, beryllia, and the rare earth metal oxides.

Silica-alumina catalyst composites having the necessary characteristics for use herein are conveniently prepared by the simultaneous co-precipitation or co-gellation (co-gel method) of a mixture of compounds of silicon and aluminum. The surface areas of the dried or partially dried composites are in general steamed-down to the useful range at temperatures in the range 500–1300° F., surface area determinations being made by the well known B.E.T. Method using nitrogen (cf. G. M. Schwab, "Handbuck der Katalyse," volume 4, page 195).

Representative and suitable co-gel-type preparative methods are to be found in the procedures as disclosed in U.S. 3,280,040, U.S. 3,399,132 and U.S. 3,401,125, except that the material other than the precursors for the silica, alumina, or other metal oxide components contemplated herein are omitted. General background information is to be found in the paper, "Control of Physical Structure of Silica-Alumina Catalyst," K. D. Ashley and W. B. Innes, Industrial & Engr. Chem., volume 44, 1952. On the other hand, the pH ranges for the co-gellation, working techniques including ion exchange and base exchange means as disclosed are in general desirably employed as disclosed in the above patent references.

Representative aromatic hydrocarbon feeds desirably employed in the process of the invention include p-xylene reduced (i.e., containing less than the equilibrium amount) $C_8$ aromatic hydrocarbon mixtures, m-xylene, p-xylene, o-xylene, ethylbenzene, o-cymene, p-cymene, m-cymene, non-equilibrium enzyme mixtures, m-diisopropylbenzene, p-diisopropylbenzene, p-diethylbenzene, m-diethylbenzene, 3-isopropylethylbenzene, m-(n-propyl)-toluene, misitylene, 1,3-dimethylnaphthalene, 1,4-diethylnaphthalene, 1,5-diisopropylnaphthalene, 1,3,5-trimethylnaphthalene, and the like polyalkyl aromatic hydrocarbons. The polymethylbenzenes and mixtures thereof are preferred feeds.

The following examples further illustrate the invention.

EXAMPLES 1–3

A series of silica-alumina catalysts (80–20 weight ratio) were prepared by the co-gellation method and extruded (one-tenth inch diameter) and tempered. Three catalysts having the characteristics:

| Catalyst: | Surface area, $M^2/g$. | *Percent* [pores >45°] *pore volume from 45A. radius* |
|---|---|---|
| A | 293 | 0 |
| B | 327 | 20 |
| C | 274 | 68 |

were tested for disproportionation activity using a xylene feed with the following results:

| Catalyst: | Relative disproportionation |
|---|---|
| A | 1.0 |
| B | .71 |
| C | .60 |

In the foregoing comparison, the process feed had the hydrocarbon composition:

| | Wt. percent |
|---|---|
| m-Xylene | 53.3 |
| Ethylbenzene | 25.2 |
| p-Xylene | 8.8 |
| o-Xylene | 6.6 |
| Toluene | 4.7 |
| Other (paraffins and naphthenes) | 1.4 |

and contained in addition 500 p.p.m. (based upon hydrocarbon) of ammonia and $2.5 \times 10^4$ p.p.m. of water. The reaction conditions were:

| | |
|---|---|
| Temperature, ° F. | 750 |
| Pressure, ATM | 1 |
| LHSV, v./v./hr.: | |
| 3 hr. at 1.76 | |
| 18.5 hrs. at 0.88 | |

These data demonstrate that for a minor disproportionation activity [the pore radius] *at least 40% of the pore volume* of a silica-alumina catalyst composite should in the main be *from pores having a pore radius* above about 45 A., that is few or none (less than 10 percent) of the catalyst [pores should have] *pore volume should be from pores having* a radius less than about 45 A.

EXAMPLE 4

A silica-alumina catalyst composite was prepared which corresponded to catalyst C in the above examples except that sufficient of magnesium chloride was included in the co-gellation preparative mixture to provide for 5 parts of magnesia in the resulting catalyst. This catalyst had a surface area of 336 square meters per grams, with about 69 percent of the [pores] *pore volume* thereof *from pores* having a pore radius greater than 45 A. The isomerization and disproportionation activities were substantially the same as for catalyst C. However, the magnesia additive had reduced the coking activity (rate of coke lay-down) by about one-half of that for catalyst C.

The foregoing demonstrates that the addition of a minor amount of magnesia to a silica-alumina isomerization catalyst effectively reduces coke formation without impairing the isomerization activity or increasing the disproportionation activity of the catalyst.

What is claimed is:

1. The process for the catalytic isomerization of an alkyl substituted polyalkyl aromatic hydrocarbon feed which comprises contacting the feed with a silica-alumina isomerization catalyst at a temperature in the range from about 700° F. to 1000° F., at a liquid hourly space velocity in the range from about 0.1 to 10, and at a pressure below about 200 p.s.i.g., wherein said catalyst consists essentially of a silica and alumina composite having a surface area in the range from about 250 to 400 square meters per gram, wherein at least 40 percent of the catalyst *pore volume is from* pores [have] *having* a radius greater than about 45 A., said feed having an aromatic carbocyclic carbon atom content below about 13, and having from 2 to about 4 of the same or different lower alkyl substituent groups; and said composite having a silica to alumina weight ratio in the range from about 70–90 to about 10–30, respectively.

2. The process as in claim 1 further characterized in that the feed is a polymethylbenzene, in that the surface area is in the range from about 270–350 square meters per gram, and in that at least about 70 percent of the *pore volume is from* pores [have] *having* a radius greater than 45 A.

3. The process as in claim 2 further characterized in that less than about 10 percent of the *pore volume is from* pores [have] *having* a radius less than 45 A.

4. The process as in claim 2 further characterized in that the composite contains, in addition to the silica and alumina, an amount in the range from about 5 to 15 parts by weight of an oxide selected from the group consisting of magnesia, zirconia, thoria and beryllia.

5. The process as in claim 4 further characterized in that the oxide is magnesia and in that the silica to alumina weight ratio is about 80 to 20, respectively.

6. The process as in claim 1 further characterized in that the composite contains, in addition to the silica and alumina, an amount in the range from about 5 to 15 parts by weight of an oxide selected from the group consisting of magnesia, zirconia, thoria, and beryllia.

7. The process as in claim 5 further characterized in that the feed is a p-xylene reduced $C_8$ aromatic hydrocarbon mixture.

8. The process as in claim 1 further characterized in that the pore radius is greater than 50 A.

9. The process as in claim 1 further characterized in that the temperature is in the range from about 750° F. to 900° F.

* * * * *